(12) United States Patent
Chou et al.

(10) Patent No.: US 11,020,884 B2
(45) Date of Patent: Jun. 1, 2021

(54) MANUFACTURING PROCESS OF A SOLID THERMAL BALANCING COMPOSITE MATERIAL

(71) Applicants: M-VICTORY SPECIFIC MATERIAL CO., LTD., Dongguan (CN); WHA YUEB TECHNOLOGY CO., LTD., Taoyuan (TW)

(72) Inventors: Ching-I Chou, Taoyuan (TW); Yu-Chia Chen, Taoyuan (TW)

(73) Assignees: M-Victory Specific Material Co., Ltd., Dongguan (CN); Wha Yueb Technology Co., Ltd., Taoyuan (TW)

( * ) Notice: Subject to any disclaimer, the term of this patent is extended or adjusted under 35 U.S.C. 154(b) by 0 days.

(21) Appl. No.: 16/537,740

(22) Filed: Aug. 12, 2019

(65) Prior Publication Data

US 2019/0358866 A1 Nov. 28, 2019

Related U.S. Application Data

(63) Continuation-in-part of application No. 15/474,173, filed on Mar. 30, 2017, now abandoned.

(51) Int. Cl.
| | | |
|---|---|---|
| B29C 43/34 | (2006.01) |
| C09J 127/06 | (2006.01) |
| C09J 123/06 | (2006.01) |
| C09J 175/04 | (2006.01) |
| C09J 163/00 | (2006.01) |
| C09J 131/04 | (2006.01) |
| C09J 195/00 | (2006.01) |
| C09J 133/12 | (2006.01) |
| C09J 133/24 | (2006.01) |
| B29K 307/04 | (2006.01) |

(52) U.S. Cl.
CPC .............. *B29C 43/34* (2013.01); *C09J 123/06* (2013.01); *C09J 127/06* (2013.01); *C09J 131/04* (2013.01); *C09J 133/12* (2013.01); *C09J 133/24* (2013.01); *C09J 163/00* (2013.01); *C09J 175/04* (2013.01); *C09J 195/00* (2013.01); *B29K 2307/04* (2013.01); *B29K 2995/0013* (2013.01)

(58) Field of Classification Search
CPC .............................. B29C 43/006; B29C 43/34
See application file for complete search history.

(56) References Cited

U.S. PATENT DOCUMENTS

| | | | | |
|---|---|---|---|---|
| 6,886,249 B2* | 5/2005 | Smalc | .................. | H01L 21/4882 |
| | | | | 165/185 |
| 8,753,552 B2* | 6/2014 | Hu | .......................... | F28F 21/02 |
| | | | | 264/29.3 |
| 8,955,580 B2* | 2/2015 | Chen | ......................... | F28F 7/00 |
| | | | | 165/133 |

(Continued)

Primary Examiner — Moshe Wilensky
Assistant Examiner — Kyle A Cook
(74) Attorney, Agent, or Firm — Rosenberg, Klein & Lee

(57) ABSTRACT

A solid thermal balancing composite material with lightweight is formed by a reinforced composite material pressured by a molding machine after going through a powder filling equipment. The reinforced composite material is a mixture of inorganic filler powders and polymer adhesives after granulation. The specific gravity of the solid thermal balancing composite material is no greater than 2.0. In addition, the present invention is adjustable in different shapes for various applications of heat dissipation.

9 Claims, 14 Drawing Sheets

(56) References Cited

U.S. PATENT DOCUMENTS

| | | | |
|---|---|---|---|
| 2002/0039675 A1* | 4/2002 | Braun | B29C 45/0013 |
| | | | 429/519 |
| 2017/0034900 A1* | 2/2017 | Strader | H01L 23/373 |
| 2018/0022969 A1* | 1/2018 | Liu | C09J 11/04 |
| | | | 252/478 |
| 2018/0237668 A1* | 8/2018 | Mizori | C09J 163/00 |
| 2020/0008316 A1* | 1/2020 | Cola | H01L 23/3735 |

* cited by examiner

MANUFACTURING PROCESS OF A SOLID THERMAL BALANCING COMPOSITE MATERIAL

This patent application is a continuation-in-part of Ser. No. 15/474,173 filed on Mar. 30, 2017.

BACKGROUND OF THE INVENTION

1. Field of the Invention

The present invention relates to a manufacturing process of a solid thermal balancing composite material, particularly to one that has a light weight.

2. Description of the Related Art

As technologies getting advanced, high functional electronic devices such as smartphones and laptops are more and more common. Also, the volume of these devices is getting smaller and the work load is getting greater. In order to maintain the efficiency in operation or even achieve a greater efficiency, heat dissipation becomes a major problem to be solved.

Conventionally, electronic devices dissipate heat energies via metal components since metals can conduct the heat rapidly. Such components made of metals with high thermal conductivity such as copper and aluminum are even more popular. FIG. 1A illustrates a conventional heat sink 120 made of copper or aluminum. The heat sink 120 includes a horizontal base 122 with a plurality of vertical heat dissipating fins 124 arranged thereon. Due to high density of metals, the specific gravity of copper is 8.9 and the one of aluminum is 2.7, resulting in an increase of weight of the heat sink 120. To reduce the weight of the heat sink 120, the metals have to be made into a shape of fins which requires more steps in the manufacturing process, thus increasing the prime costs. Besides, the heat dissipating fins have to be manufactured with a height h for operation which is not suitable for installation on devices with small volumes.

FIG. 1B is a heat sink 130 disclosed in U.S. Pat. No. 6,758,263. It has a graphite base plate 134 including a cavity 138 at a bottom thereof, a piece of copper 132 inserted into the cavity 138 and a plurality of fins 136 disposed on the base plate 134 for heat dissipation. The graphite base plate 134 is lighter than a metal base plate, but graphite can only conduct heat in a direction of XY-plane. In other words, heat dissipation along a vertical Z-axis direction cannot be performed well. Therefore, the heat cannot be dissipated by the fins 136 efficiently and would be kept within the baseplate 134. On the other hand, with a certain height, the fins 136 are not suitable in applications to small and lightweight electronic devices.

Still, there is a problem in graphite materials—the structure of graphite materials is layered. Such structure has its molecules tightly combined horizontally but in vertical combination, the molecules are easily detached since they are combined by van der Waal's force only.

In short, it is desirable to produce a heat dissipating element with light weight and low prime costs by making use of the high thermal conductivity of metals and graphite.

SUMMARY OF THE INVENTION

A primary objective of the present invention is to provide a solid thermal balancing composite material that is lighter in weights and has less volume than current metal heat dissipating products in the field with more efficiency.

Another objective of the present invention is to provide a solid thermal balancing composite material that is applicable to electronic products in different solid shapes for heat dissipation without thermal interface materials.

Yet another objective of the present invention is to provide a manufacturing process of a solid thermal balancing composite material that reduces prime costs with concise steps.

To achieve the objectives mentioned above, the present invention comprises steps as follows:

a. providing a reinforced composite material with a diameter from 300 μm to 3.5 mm and formed by mixing inorganic filler powders and polymer adhesives after granulation, said inorganic filler powders also being mixed with carbon fibers or polymer fibers having a length ranging from 10 nm to 10 μm for reinforcement, said inorganic filler powders being selected from a group consisting of graphite, graphene, carbon materials, and thermally-conductive inorganic materials;

wherein said polymer adhesives is produced by having a polymer blend being a matrix material mixed with a thermally-conductive filler and a binary silicon-hydrogen compound containing at least one functional group, said polymer blend including a polymer material being able to perform polymerization and peroxides being able to perform polymerization for forming said polymer blend, said polymer material being polydimethylsiloxane with at least two vinyl groups, said thermally-conductive filler including at least two compatible thermally-conductive materials, one of which being graphite powders with viscosity and compressibility and another one of which being an inorganic composite material formed by graphite coated by nickel, said binary silicon-hydrogen compound including at least two functional groups, one of which being able to react to said polymerization process of said polymer material and another one of which being able to form chemical bond on a surface of said thermally-conductive filler;

b. providing a plurality of metal particles having a value of thermal conductivity greater than 90 W/mk and a diameter ranging from 1 nm to 1 mm;

c. mixing said metal particles with said reinforced composite material to form a highly thermally conductive reinforced composite material;

d. providing a powder filling equipment and pouring said highly thermally conductive reinforced composite material therein;

e. providing a molding machine including an upper half and a lower half, said highly thermally conductive reinforced composite material being poured in said molding machine by said powder filling equipment and performing a pressure process at least once, said pressure process including application of preliminary pressure and secondary pressure, wherein a quantity of said highly thermally conductive reinforced composite material is again poured in said molding machine subsequent to said application of said preliminary pressure and prior to said application of said secondary pressure, each of said preliminary pressure and secondary pressure being maintained at a constant pressure for at least 3 seconds for solidification to thereby form a solid thermal balancing composite material with a heat dissipation structure; and f. ejecting said solid thermal balancing composite material from said molding machine, said solid thermal balancing composite material having a specific gravity no greater than 2.0.

The at least two functional groups of the binary silicon-hydrogen compound is a vinyl group and an alkoxy group.

The solid thermal balancing composite material further includes a protection layer of polymer adhesives formed by dipping, molding or spraying thereon. It is molded into a flat piece or a shape according to contours of a pre-determined product to be applied on, and the flat piece further has a periphery thereof engaged by a protection frame; the protection frame includes an outer frame engaging an engaging frame.

In addition, the pressure process in the step (e) is repeated until said solid thermal balancing composite material is formed to have a specified thickness.

With structures disclosed above, the present invention is able to manufacture a thermal balancing composite material by molding a reinforced composite material with pressure that has an enhanced structure with a specific gravity no greater than 2.0, which is comparatively lighter than the 8.9 of copper and 2.7 of aluminum in metal dissipating pieces. Moreover, the reinforced composite material has graphite materials or layered inorganic materials with high thermal conductivity that efficiently balance and dissipate thermal energy from heat sources along a direction of XY-plane. With addition of metal particles, thermal conductivity in a direction of Z-axis is thereby enhanced as well. Also, the molding produces a huge quantity of products with efficiency. On the other hand, the inorganic composite material of graphite coated by nickel is well compatible with graphite powders and is able to fill in the space left after the graphite powders formed into a shape of flat pieces when mixed therewith, reducing the free space between the graphite pieces and reducing the thermal resistance for the present invention.

DETAILED DESCRIPTION OF THE PREFERRED EMBODIMENT

Figure 1A:
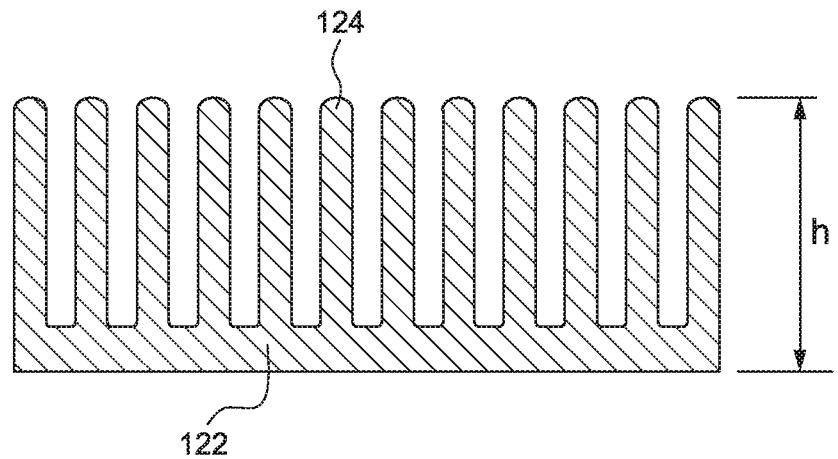
FIG. 1A is a perspective view of a conventional metal heat dissipating element.
Figure 1B:
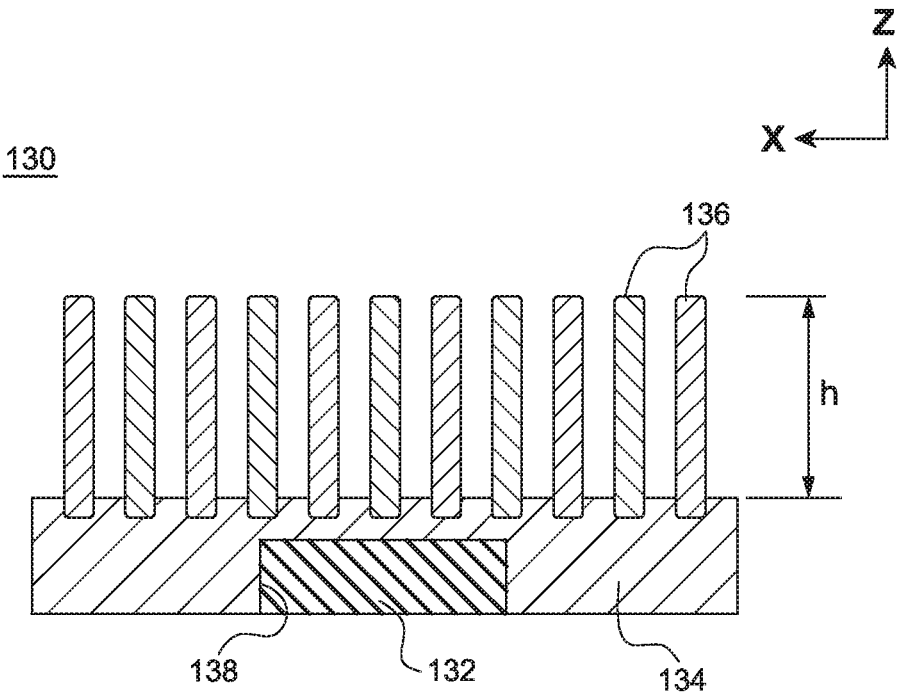
FIG. 1B is a heat dissipating element disclosed in U.S. Pat. No. 6,758,263.
Figure 2:
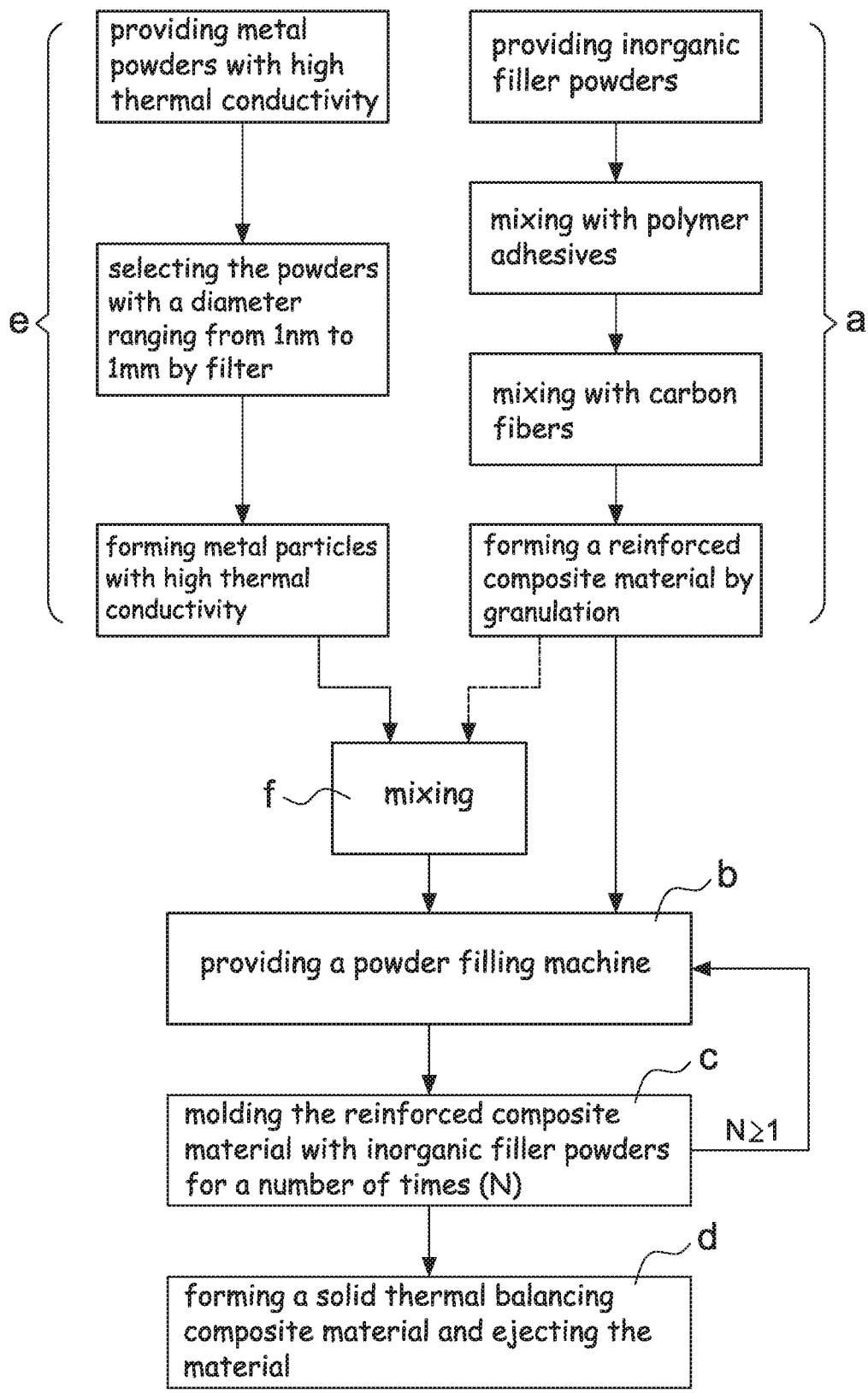
FIG. 2 is flow diagram of the present invention.
Figure 3:
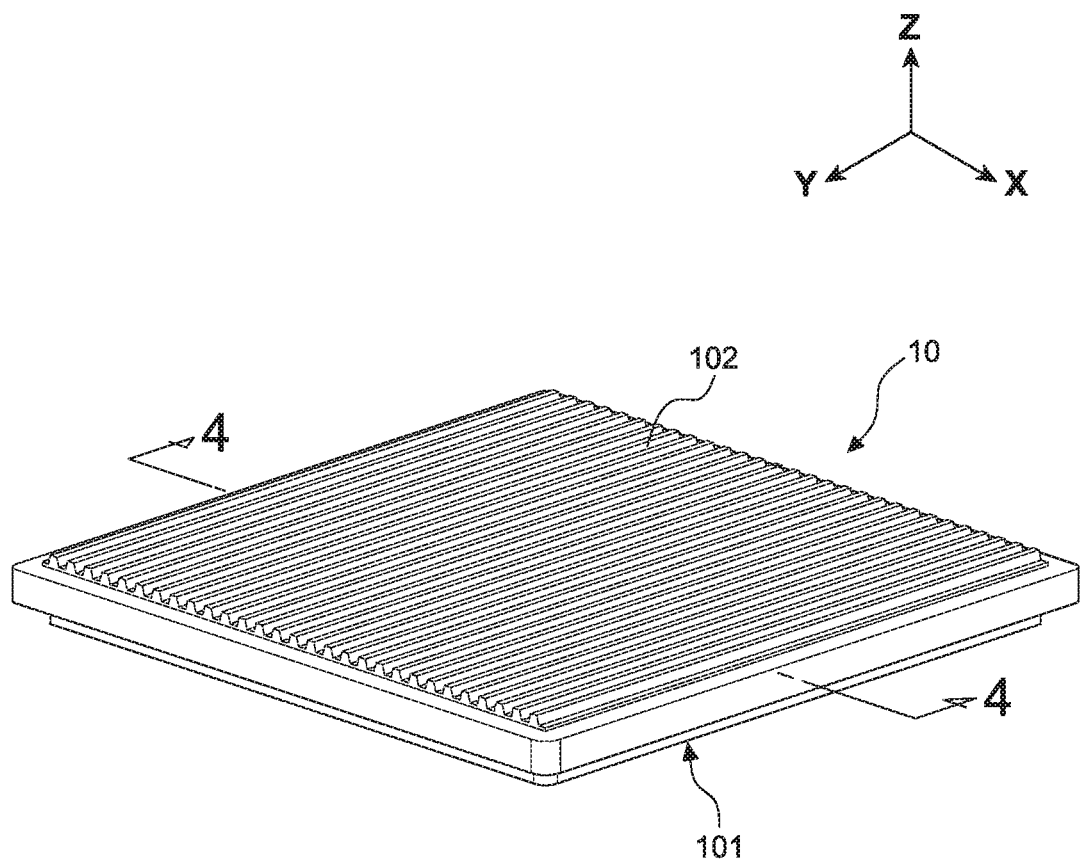
FIG. 3 is a perspective view of a solid thermal balancing composite material in the present invention.

Referring to FIG. 2, the present invention comprises steps as follows.

Step a: providing a reinforced composite material 14 formed by mixture of inorganic filler powders 11 and polymer adhesives 12 after granulation. The inorganic filler powders 11 are mixed with carbon fibers or polymer fibers 13 having a length ranging from 10 nm to 10 um for reinforcement, forming a reinforced material to be reinforced composite material 14 with a diameter from 300 um to 3.5 mm after granulation. The inorganic filler powders 11 are selected from a group consisting of graphite, graphene, carbon materials, and inorganic materials with high thermal conductivity, and the inorganic materials with high thermal conductivity are made of layered inorganic materials of silica, boron nitride, aluminum nitride, silicon carbide, diamonds, or mica.

The graphite and carbon materials conduct thermal energy efficiently, but structural strength of these materials is not strong enough. Therefore, the carbon fibers or polymer fibers 13 with a length from 10 nm to 10 um are added for reinforcement of the inorganic filler powders, so as to form a reinforced composite material 14 with a diameter from 300 um to 3.5 mm after granulation.

In this embodiment, the granulation process has a liquid solution dissolving the polymer adhesives 12 and then mixing with the inorganic powders 11, or has the polymer adhesives 12 and the inorganic powders 11 heated for producing the reinforced composite material 14. The weight percentage of the inorganic filler powders 11 ranges from 80%-95% and the weight percentage of the polymer adhesive 12 ranges from 5%-20% correspondingly. In a preferred embodiment, a proportion between the inorganic filler powders 11 and the polymer adhesive 12 is 85%:15%. The polymer adhesive 12 includes soluble materials such as asphalt, polyvinyl alcohol, polyvinyl acetate, polyimide, polyurethane, polyethylene glycol, polyethylene, polyvinyl chloride, phenolic resin, epoxide, polymethyl methacrylate, or fusible polymer materials.

Figure 4:
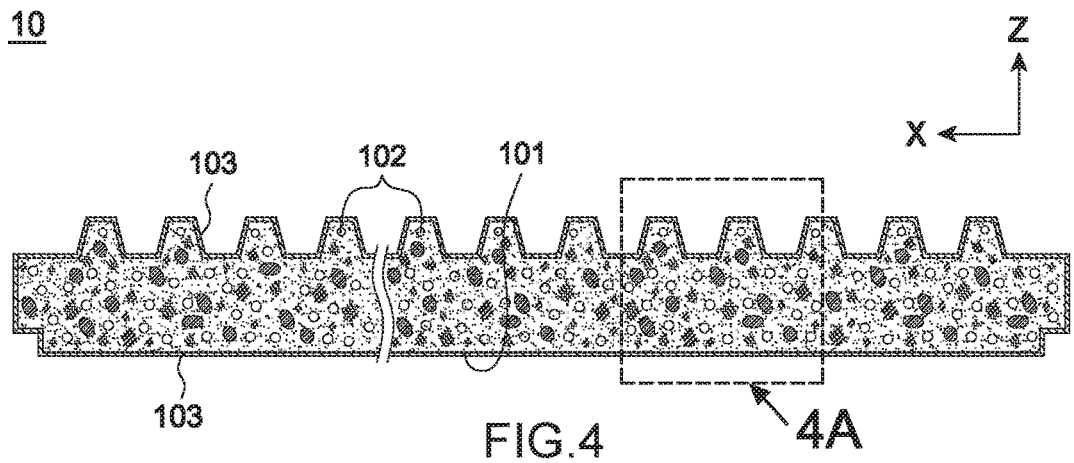
FIG. 4 is a sectional view of the solid thermal balancing composite material.
Figure 4A:
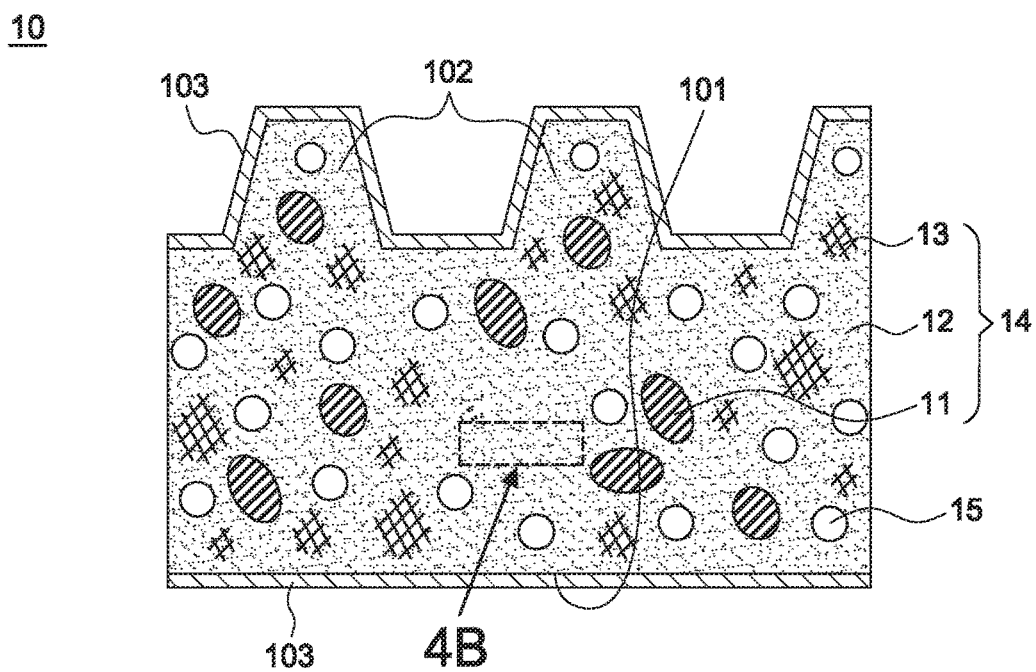
FIG. 4A is enlarged view of area 4A in FIG. 4.
Figure 4B:
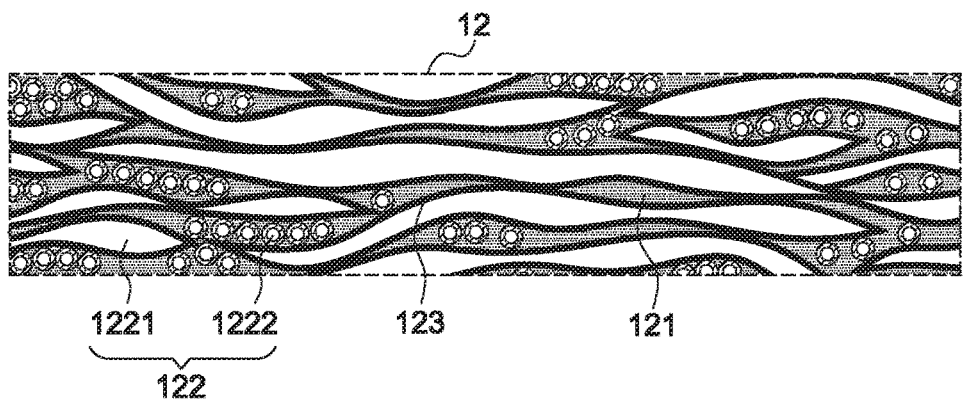
FIG. 4B is enlarged view of area 4B in FIG. 4A.

FIG. 4B further illustrated the feature of the polymer adhesive 12. The polymer adhesive 12 has a polymer blend 121 being a matrix material mixed with a thermally-conductive filler 122 and a binary silicon-hydrogen compound 123 containing at least one functional group, the bold line drawn in FIG. 4B represents the location of binary silicon-hydrogen compound 123. The polymer blend 121 includes a polymer material being able to perform polymerization and peroxides being able to perform polymerization for forming the polymer blend 121. In this embodiment, the polymer material is polydimethylsiloxane with at least two vinyl groups and the thermally-conductive filler 122 includes at least two compatible thermally-conductive materials; one of which is graphite powders 1221 with viscosity and compressibility and another one of which is an inorganic composite material 1222 formed by graphite coated by nickel. The binary silicon-hydrogen compound 123 includes at least two functional groups; one of which is able to react to the polymerization process of the polymer material and another one of which is able to form chemical bond on a surface of the thermally-conductive filler 122.

With the graphite coated by nickel served as the inorganic composite material 1222, the thermally-conductive filler 122 is nicely compatible with the graphite powders 1221 and is able to fill in the space left after the graphite powders 1221 are formed into a shape of flat pieces when mixed therewith, thereby reducing the free space between the graphite pieces and providing better efficiency in thermal dissipation for the present invention. In addition, due to the acidity and water-absorbing features, the graphite would react with the alkoxy group of the binary silicon-hydrogen compound 123 by performing hydrolysis and condensation process; that is, the binary silicon-hydrogen compound 123 would form chemical bonds on the surface of the graphite and produce the vinyl group. The vinyl group then joins the polymerization process of the polymer material by the peroxides, further forming the chemical bond between the graphite and the polymer blend and the graphite. The spaces between the structures of the polymer blend are therefore filled up and thereby the thermal resistance is reduced as well.

Step b. providing a powder filling equipment 20 and pouring the reinforced composite material 11 therein for transportation.

Step c. providing a molding machine 30 including an upper half 40 and a lower half 50. The reinforced composite material 11 is then poured in the molding machine 30 and performed pressure process for a number of times N, where N≥1. The pressure process includes preliminary pressure and secondary pressure, each of which remains a constant pressure for at least 3 seconds for solidification, so as to form a solid thermal balancing composite material 10 with a heat dissipation structure.

In this embodiment, the powder filling machine 20 either regularly or continuously adds the reinforced composite material 11 into the molding machine 30, and then the molding machine 30 perform a constant pressure force between 30 MPa to 300 MPa for at least 3 seconds before ejection of the molded material.

Step d. ejecting the solid thermal balancing composite material 10 from the molding machine 30. The solid thermal balancing composite material 10 has a specific gravity equals to or less than 2.0. The thickness of the solid thermal balancing composite material 10 in a direction of Z-axis is greater than 0.5 mm.

A bottom surface 101 of the solid thermal balancing composite material 10 is a flat surface or arranged in a shape according to contours of a heat source it is to be disposed on. A top surface 102 of the solid thermal balancing composite material 10 is wavy or in shapes of fins to enhance the dissipation in the Z-axis direction. With the reinforced composite material 14 and the molding process, the solid thermal balancing composite material 10 does not have a problem of interlaminar peeling because unlike materials made of graphite sheets, it is not formed by van der Waals forces; but still, it remains its thermal dissipation characteristics. Also, graphite sheets cannot be made into different shapes but only flat pieces. Metal radiators can be made into shapes of fins but it requires multiple steps in manufacturing process and spaces for placement.

Figure 5:
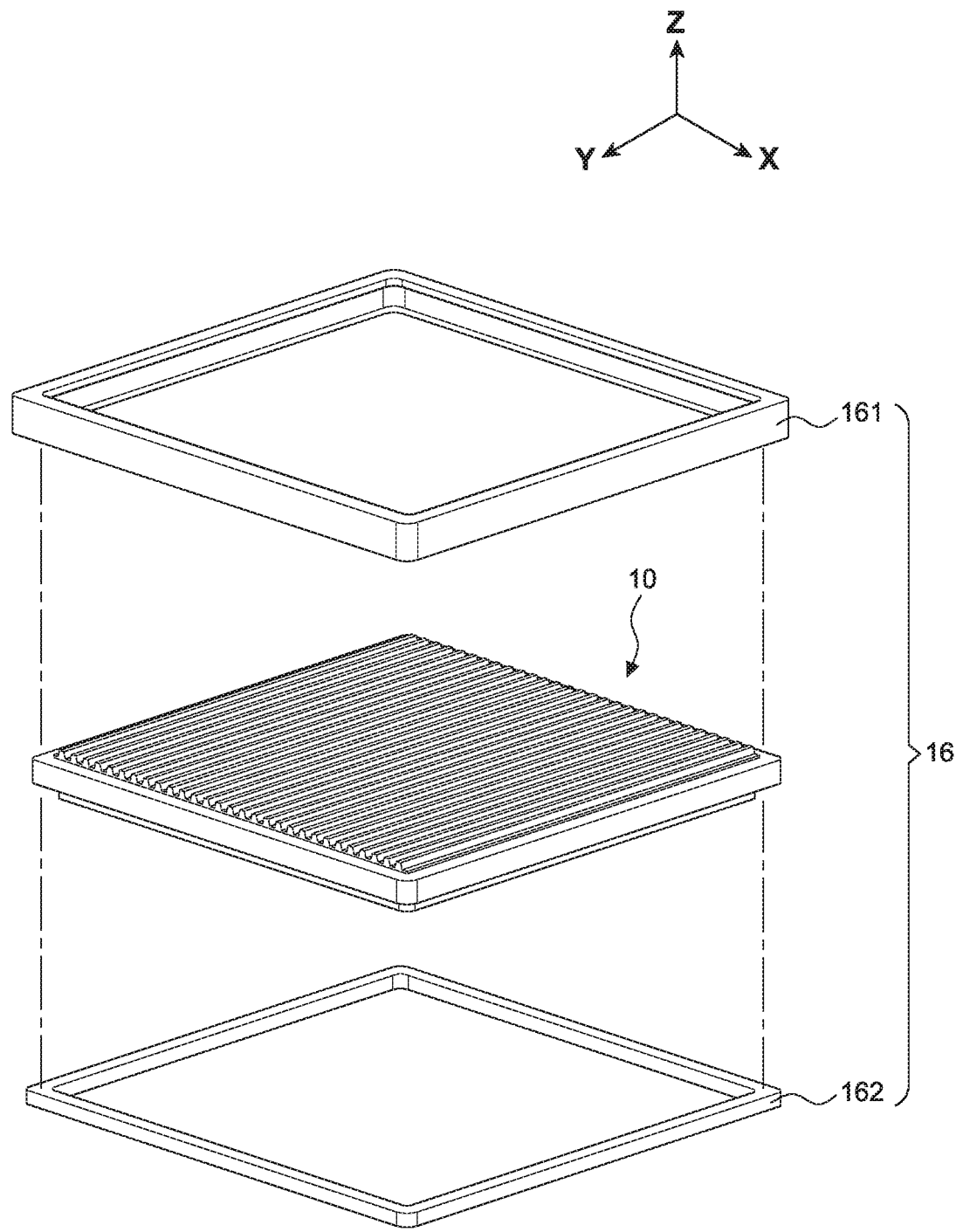
FIG. 5 is an exploded view of a protection frame before engagement with the solid thermal balancing composite material.
Figure 6:
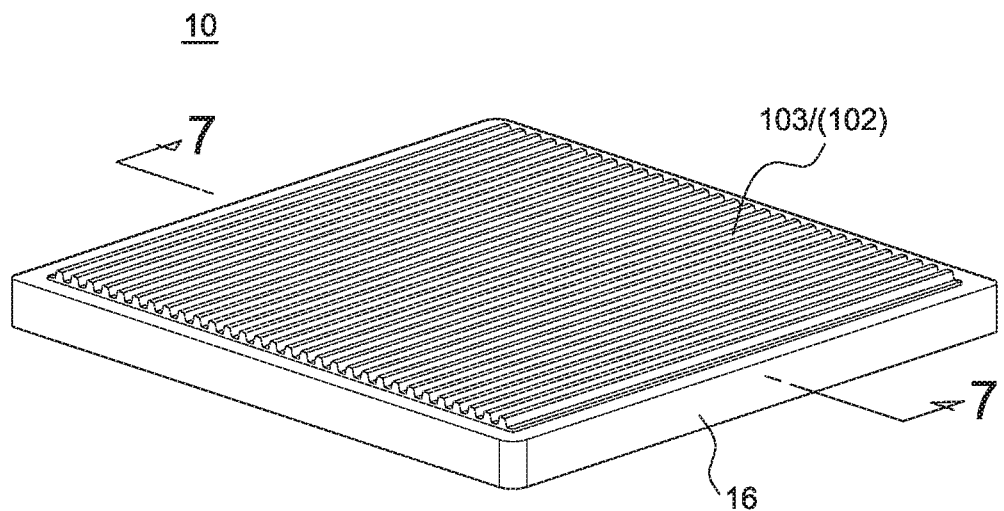
FIG. 6 is a perspective view of the solid thermal balancing composite material engaged with the protection frame.
Figure 7:
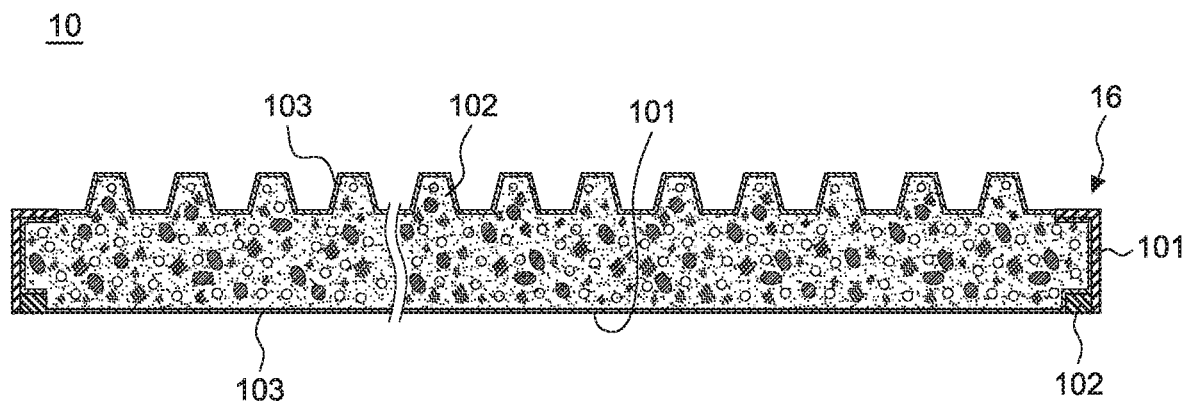
FIG. 7 is a sectional view taken along line 7-7 of FIG. 6.

In this embodiment, the solid thermal balancing composite material 10 further includes a protection layer 103 for the polymer adhesives formed by dipping, molding or spraying thereon, preventing the powders from falling and thereby enhancing its stability. In addition, the solid thermal balancing composite material 10 is molded into a flat piece or a shape according to contours of a pre-determined product to be applied on. A protection frame 16 further engages around periphery of the solid thermal balancing composite material 10 for holding the structure firm as shown in FIGS. 5 and 6. The protection frame 16 includes an outer frame 161 engaging an engaging frame 162; it can be a metal frame or made of other materials with metal sheets wrapping around.

In a preferred embodiment, the present invention further includes step e. providing a plurality of metal particles 15 formed by metal powders with a value of thermal conductivity greater than 90 W/mk and a diameter ranging from 1 nm to 1 mm, and step f. mixing the metal particles 15 with the reinforced composite material 14 before poured into the powder filling equipment 20. In this embodiment, the metal particles 15 with high thermal conductivity is selected from a group consisting of gold, silver, copper, iron, aluminum, titanium, and alloy of any two of them. A proportion between the metal particles 15 and the reinforced composite material 14 ranges from 10%:90% to 25%:75%. The metal particles 15 enhance thermal dissipation in the Z-axis direction, and with such combination, the thermal dissipation is performed evenly within a comparatively short period than products in the prior art.

The molding machine 30 in Step c. can be vertical or rotational for operation. In an applicable embodiment, the molding machine 30 is vertical and a molding process thereby is shown in FIGS. 8A-8F. The lower half 50 of the molding machine 30 includes a lower mold 51 with a lower mold cavity 511, a lower mold core 52 installed in the lower mold 51, and a displaceable ejector pin 53 arranged within the lower mold core 52. The upper half 40 of the molding machine 30 is disposed above the lower half 50 thereof correspondingly. The upper half 40 includes an upper mold 41 with an upper mold cavity 411 arranged at a center thereof, corresponding to a position of the lower mold cavity 511, a displaceable upper mold core 42, and a pair of entry passages 412 connecting the upper mold cavity 411 at an upper position of the upper mold cavity 411. A bottom of the upper mold core 42 has a concave-convex pattern 421 in accordance with a pre-determined shape of the solid thermal balancing composite material 10.

Figure 8A:
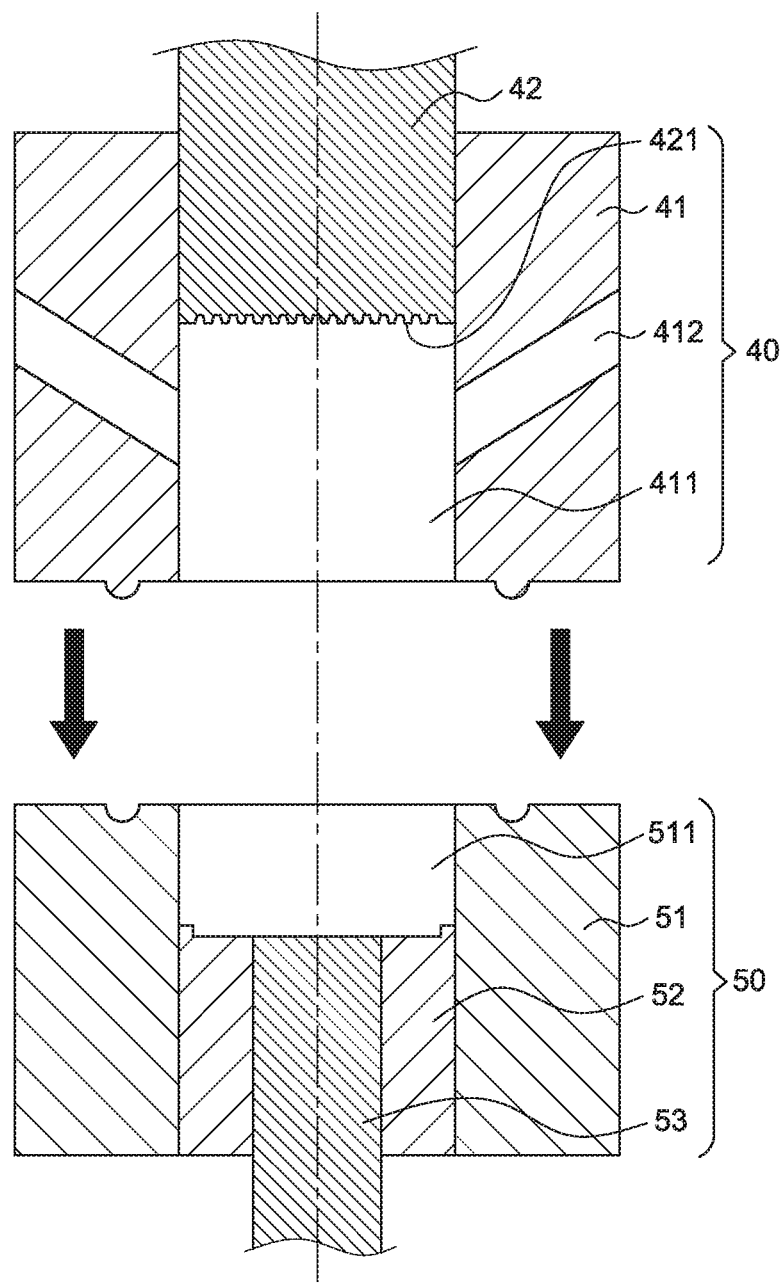
FIGS. 8A-8F are schematic diagrams showing a molding process of the present invention.
Figure 8B:
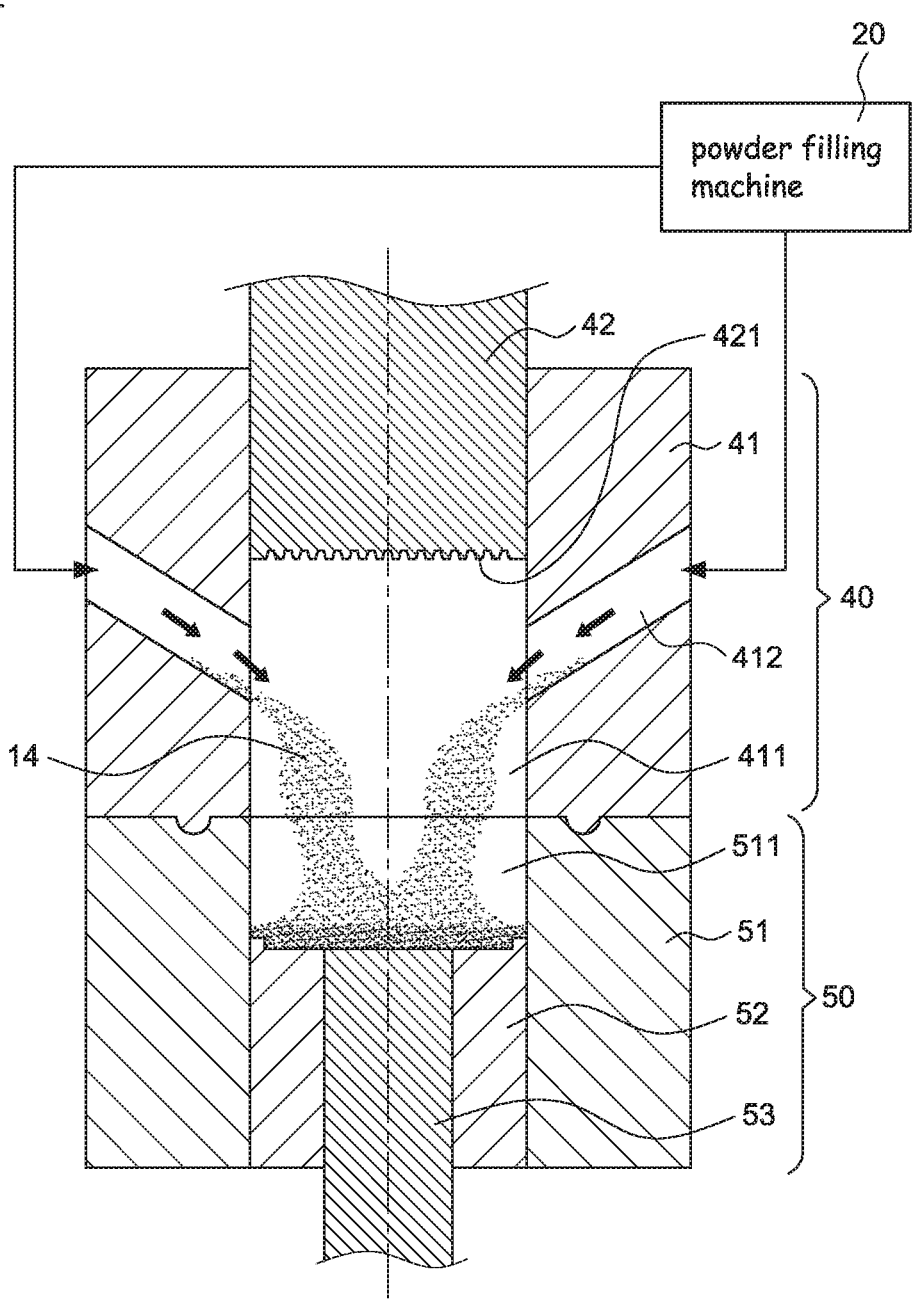
Figure 8C:
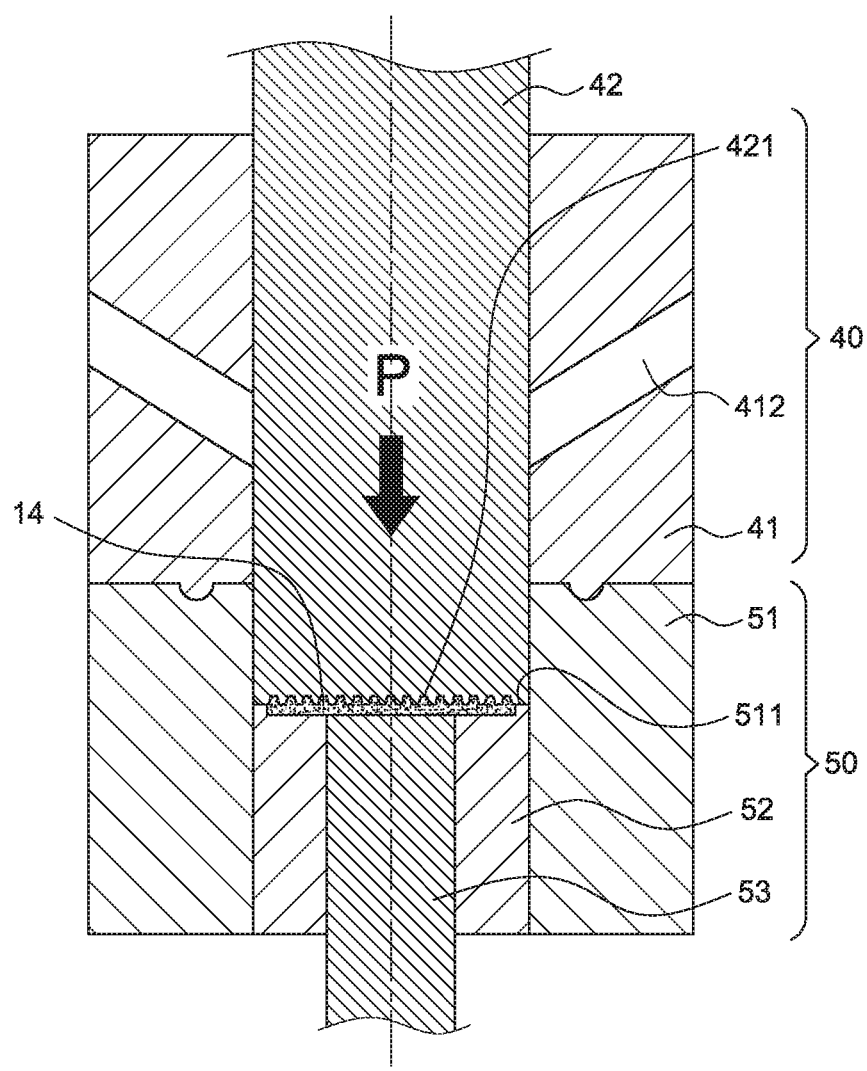
Figure 8D:
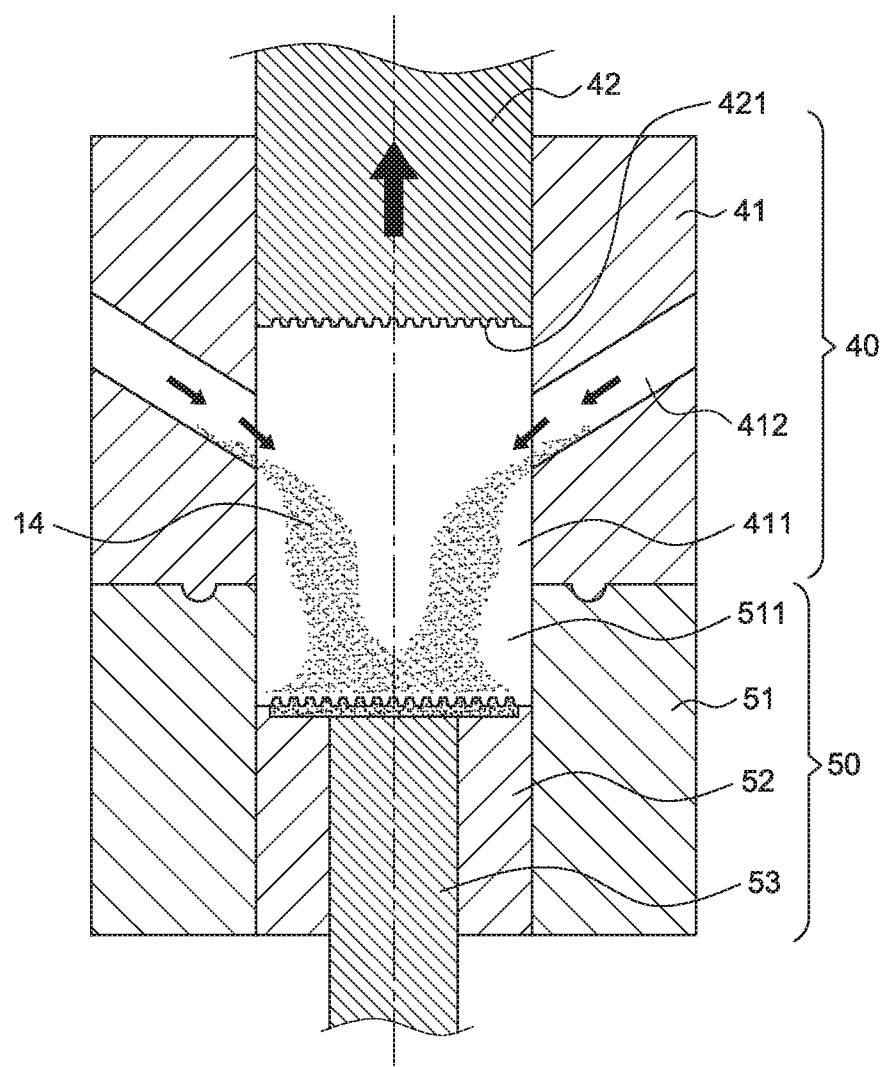
Figure 8E:
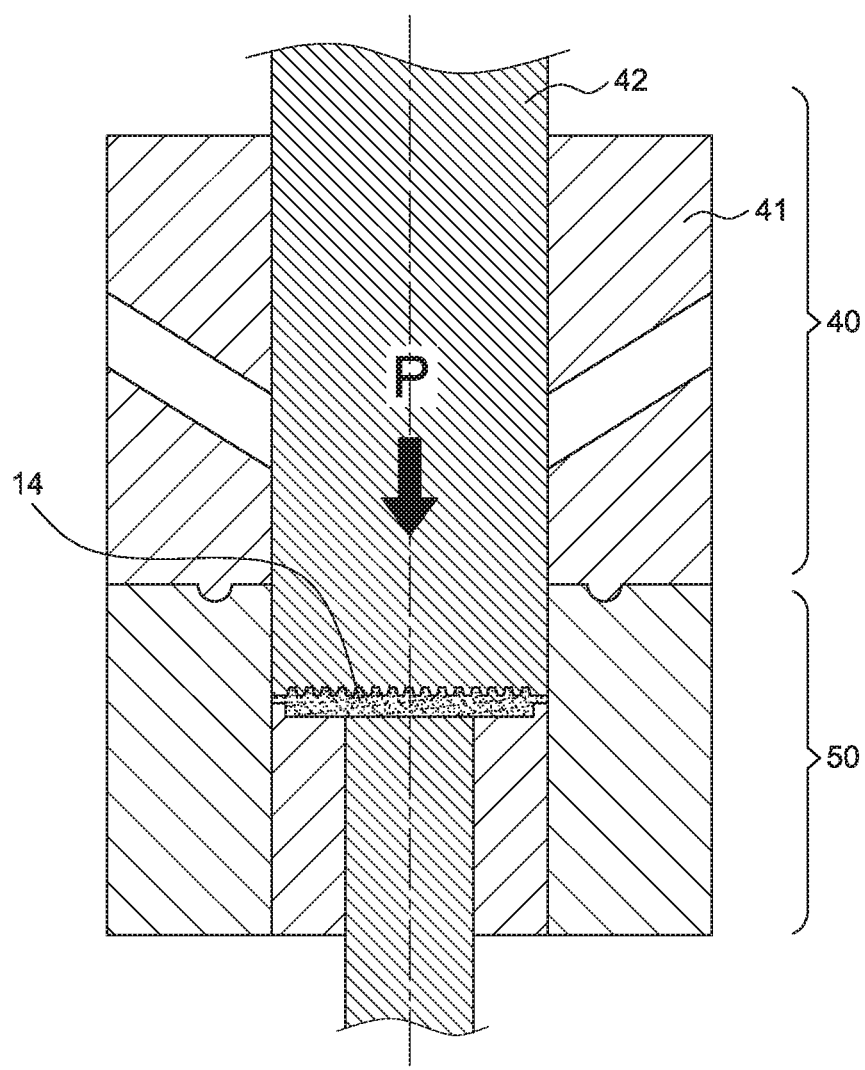
Figure 8F:
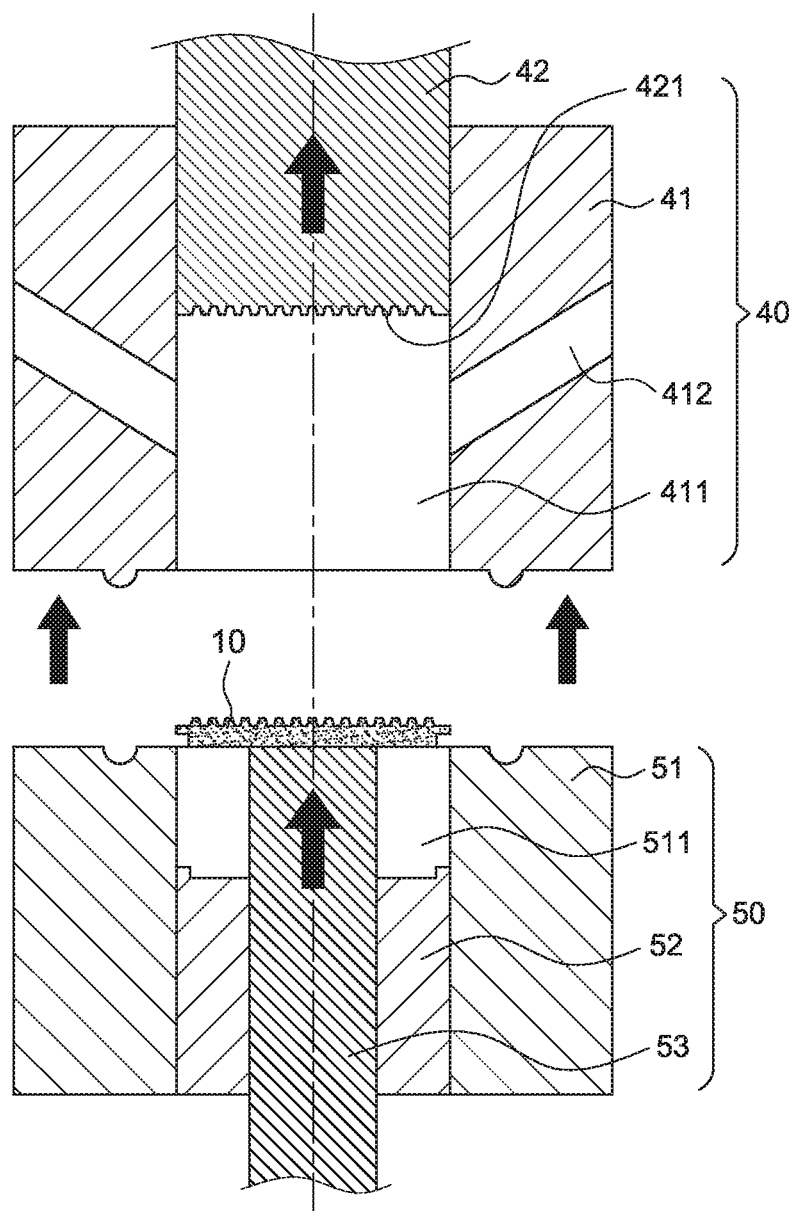

FIG. 8A illustrated the upper and lower halves 40, 50 are opened. FIG. 8B showed the upper mold 41 is closed on the lower mold 51 with the powder filling machine 20 filling in the reinforced composite material 14. With a rotational molding machine, the reinforced composite material 14 is directly filled into the lower mold cavity 511. In FIG. 8C, the upper mold core 42 is closed to the lower mold core 52, compressing the reinforced composite material 14 in the lower mold cavity 511 by pressure P; the pressure process is maintained for at least 10 seconds. FIG. 8D further illustrated the upper mold 41 is elevated and reinforced composite material 14 is filled in again via the entry passages 412. The in FIG. 8E, the upper mold 41 and the upper mold core 42 are closed to the corresponding lower mold 51 and lower mold core 52 again to compress the newly added reinforced composite material 14 on the compressed material by pressure P. Such compression is performed for a number of times N, where N≥1, until a pre-determined thickness is reached and a solid thermal balancing composite material 10 is formed. Lastly, the upper mold 41 is elevated and the solid thermal balancing composite material 10 in the lower mold cavity 511 is ejected by an ejector pin 53 as shown in FIG. 8F.

With the flexible characteristics of the materials, the compression process is performed by a preliminary pressure and then a secondary pressure, each remaining a constant pressure for at least 3 seconds for solidification to form the solid thermal balancing composite material 14. Otherwise upon the upper mold core 42 leaving the lower mold core 52, the reinforced composite material 14 would inflate, failing to form the solid composite material. Therefore, the constant pressure is a necessity in the present invention.

Figure 9:
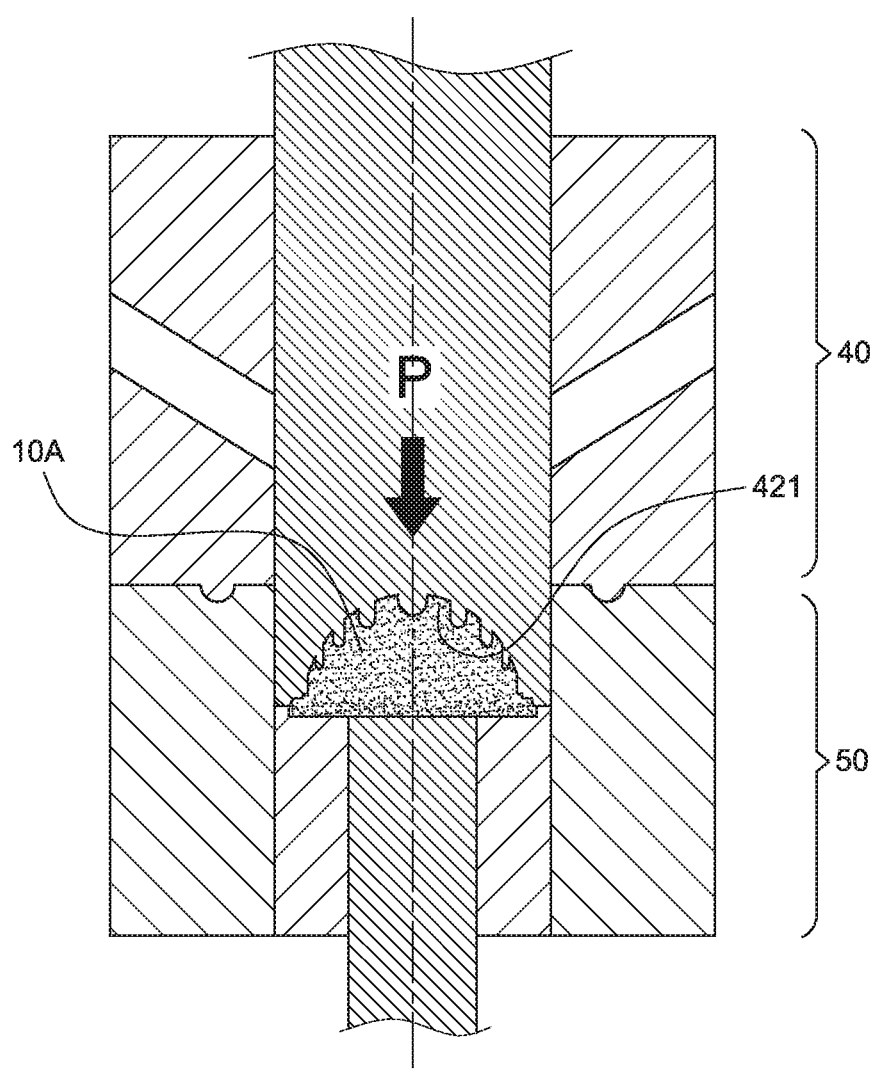
FIG. 9 is another schematic diagram showing the molding process.

Further with reference to FIG. 9, the upper and lower halves 40, 50 can be designed in different shapes in accordance with contours of products, so as to achieve better efficiency in heat dissipation.

Figure 10:
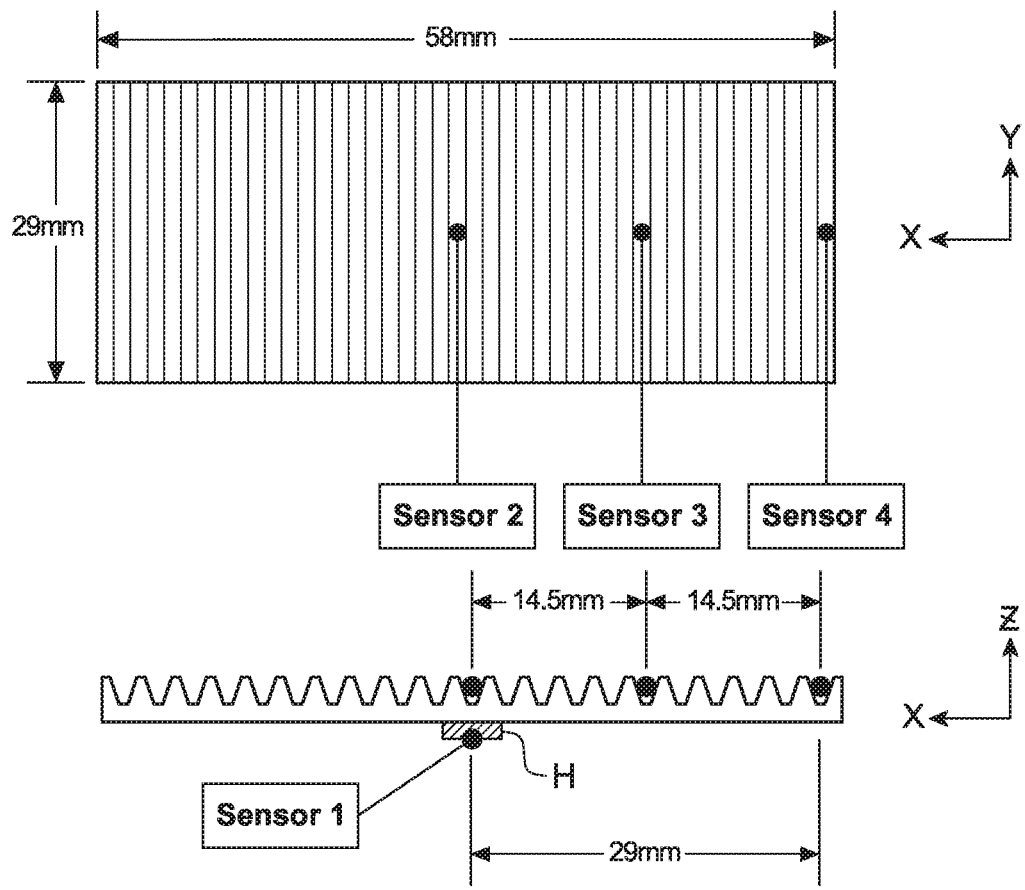
FIG. 10 is a schematic diagram showing position of 4 sensors in an experiment of thermal conductivity.

The following chart is a recordation of a heat dissipation experiment. It is a comparison of a solid thermal balancing composite material 10 without metal particles 15, a solid thermal balancing composite material 10 with metal particles 15, and a conventional heat sink made of copper or aluminum. The pieces have a length of 58 mm, a width of 29 mm, and a thickness of 2.4 mm. There are 4 sensors arranged on each piece as shown in FIG. 10. Sensor 1 is placed on a heat source. Sensor 2 is placed on the material corresponding to the position of the heat source. Sensor 3 is placed at a position from sensor 2 with a distance of 14.5 mm. Sensor 4 is placed at a position from sensor 2 with a distance of 29 mm. The data is recorded as follows.

| | Heat Source Temperature: 105° C./ Environment Temperature: 23.8° C. | | |
|---|---|---|---|
| | Conventional heat sink (Specific gravity 2.7) | Solid thermal balancing composite material without metal particles (Specific gravity 1.9) | Solid thermal balancing composite material without metal particles (Specific gravity 2.0) |
| Temperature at Sensor 1 | 64.6° C. | 48.5° C. | 48.1° C. |
| Temperature at Sensor 2 | 40.4° C. | 31.5° C. | 32.1° C. |
| Temperature at Sensor 3 | 40.2° C. | 31.4° C. | 31.6° C. |
| Temperature at Sensor 4 | 38.7° C. | 30.9° C. | 31.2° C. |

We can learn from the chart that the temperature detected on the solid thermal balancing composite material without metal particles at Sensor 1 and Sensor 2 are lower than the ones detected on the conventional heat sink, and the temperature detected on the solid thermal balancing composite material with metal particles at Sensor 1 is even lower than the previous degrees but the temperature at Sensor 2 is only slightly higher than the composite material without metal particles, indicating that the heat energy is dissipated effectively. A similar result is shown by the degrees detected by Sensor 3 and 4.

In short, the present invention is able to provide a solid thermal balancing composite material 14 formed by pressure molding with enhanced structure and a specific gravity no more than 2.0. Comparing to conventional heat sinks made of metals such as copper and aluminum, it has a lighter weight than the specific gravity of copper 8.9 and aluminum 2.7. In addition, the graphite materials or layered inorganic materials in the present invention have high thermal conductivity in a direction of XY-plane, further conducting the heat effectively. With mixture of the metal particles with high thermal conductivity 15 and reinforced composite material 14, the solid thermal balancing composite material 10 can further dissipate the heat in the direction along Z-axis as well, so as to achieve a rapid and even dissipation. Also, the solid thermal balancing composite material 10 can be produced in a great quantity within a short period with the molding process.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A manufacturing process of a solid thermal balancing composite material, comprising:
   a. providing a reinforced composite material with a diameter from 300 μm to 3.5 mm and formed by mixing inorganic filler powders and polymer adhesives after granulation, said inorganic filler powders also being mixed with carbon fibers or polymer fibers having a length ranging from 10 nm to 10 μm for reinforcement, said inorganic filler powders being selected from a group consisting of graphite, graphene, carbon materials, and thermally-conductive inorganic materials; wherein each of said polymer adhesives is produced by a polymer blend of a matrix material mixed with a thermally-conductive filler and a binary silicon-hydrogen compound containing at least one functional group, said polymer blend including a polymer material being able to perform polymerization and peroxides being able to perform polymerization, said polymer material being polydimethylsiloxane with at least two vinyl groups, said thermally-conductive filler including at least two compatible thermally-conductive materials, one of the thermally-conductive materials being graphite powders with viscosity and compressibility and another of the thermally-conductive materials being an inorganic composite material formed by graphite coated with nickel, said binary silicon-hydrogen compound including at least two functional groups, one of the functional groups being able to react to said polymerization process of said polymer material and another of the functional groups being able to form chemical bond on a surface of said thermally-conductive filler;
   b. providing a plurality of metal particles having a value of thermal conductivity greater than 90 W/mk and a diameter ranging from 1 nm to 1 mm;
   c. mixing said metal particles with said reinforced composite material to form a thermally conductive reinforced composite material;
   d. providing powder filling equipment and pouring said thermally conductive reinforced composite material therein;
   e. providing a molding machine including an upper half and a lower half, said thermally conductive reinforced composite material being poured in said molding machine by said powder filling equipment and performing a pressure process at least once, said pressure process including application of preliminary pressure and secondary pressure, wherein a quantity of said thermally conductive reinforced composite material is again poured in said molding machine subsequent to said application of said preliminary pressure and prior to said application of said secondary pressure, each of said preliminary pressure and secondary pressure being maintained at a constant pressure value for at least 3 seconds for solidification to thereby form said solid thermal balancing composite material having a heat dissipation structure; and
   f. ejecting said solid thermal balancing composite material from said molding machine, said solid thermal balancing composite material having a specific gravity no greater than 2.0.

2. The manufacturing process of a solid thermal balancing composite material as claimed in claim 1, wherein the at least two functional groups of the binary silicon-hydrogen compound is a vinyl group and an alkoxy group.

3. The manufacturing process of a solid thermal balancing composite material as claimed in claim 1, wherein a weight percentage of said inorganic filler powders ranges from 80%-95% and a weight percentage of said polymer adhesives ranges from 5%-20% correspondingly.

4. The manufacturing process of a solid thermal balancing composite material as claimed in claim 1, wherein a weight percentage of said metal particles ranges from 10%-25% and a weight percentage of said reinforced composite material ranges from 75%-90% correspondingly.

5. The manufacturing process of a solid thermal balancing composite material as claimed in claim 1, wherein said polymer adhesives include asphalt, polyvinyl alcohol, polyvinyl acetate, polyimide, polyurethane, polyethylene glycol, polyethylene, polyvinyl chloride, phenolic resin, epoxide, polymethyl methacrylate, or fusible polymer materials, and said thermally-conductive inorganic materials are made of layered inorganic materials of silica, boron nitride, aluminum nitride, silicon carbide, diamonds, or mica.

6. The manufacturing process of a solid thermal balancing composite material as claimed in claim 1, wherein said solid thermal balancing composite material further includes a protection layer for said polymer adhesives formed by dipping, molding or spraying thereon.

7. The manufacturing process of a solid thermal balancing composite material as claimed in claim 1, wherein said solid thermal balancing composite material is molded into a shape according to contours of a pre-determined product to be applied on.

8. The manufacturing process of a solid thermal balancing composite material as claimed in claim 1, wherein said pressure process in (e) is repeated until said solid thermal balancing composite material is formed to have a specified thickness.

9. A manufacturing process of a solid thermal balancing composite material, comprising:
  a. providing a reinforced composite material with a diameter from 300 μm to 3.5 mm and formed by mixing inorganic filler powders and polymer adhesives after granulation, said inorganic filler powders also being mixed with carbon fibers or polymer fibers having a length ranging from 10 nm to 10 μm for reinforcement, said inorganic filler powders being selected from a group consisting of graphite, graphene, carbon materials, and thermally-conductive inorganic materials;
  wherein each of said polymer adhesives is produced by a polymer blend of a matrix material mixed with a thermally-conductive filler and a binary silicon-hydrogen compound containing at least one functional group, said polymer blend including a polymer material being able to perform polymerization and peroxides being able to perform polymerization, said polymer material being polydimethylsiloxane with at least two vinyl groups, said thermally-conductive filler including at least two compatible thermally-conductive materials, one of the thermally-conductive materials being graphite powders with viscosity and compressibility and another of the thermally-conductive materials being an inorganic material formed by graphite coated with nickel, said binary silicon-hydrogen compound including at least two functional groups, one of the functional groups being able to react to said polymerization process of said polymer material and another of the functional groups being able to form chemical bond on a surface of said thermally-conductive filler;
  b. providing a plurality of metal particles having a value of thermal conductivity greater than 90 W/mk and a diameter ranging from 1 nm to 1 mm;
  c. mixing said metal particles with said reinforced composite material to form a thermally conductive reinforced composite material;
  d. providing powder filling equipment and pouring said thermally conductive reinforced composite material therein;
  e. providing a molding machine including an upper half and a lower half, said thermally conductive reinforced composite material being poured in said molding machine by said powder filling equipment and performing a pressure process at least once, said pressure process including application of preliminary pressure and secondary pressure, wherein a quantity of said thermally conductive reinforced composite material is again poured in said molding machine subsequent to said application of said preliminary pressure and prior to said application of said secondary pressure, each of said preliminary pressure and secondary pressure being maintained at a constant pressure value for at least 3 seconds for solidification to thereby form said solid thermal balancing composite material having a heat dissipation structure, and repeating said pressure process until said solid thermal balancing composite material is of a specified thickness;
  f. ejecting said solid thermal balancing composite material from said molding machine, said solid thermal balancing composite material having a specific gravity no greater than 2.0 and being molded into a flat piece; and
  g. providing a protection frame engaging around a periphery of said solid thermal balancing composite material, said protection frame having an outer frame connected to an engaging frame.

* * * * *